(12) United States Patent
Parkvall et al.

(10) Patent No.: US 11,622,290 B2
(45) Date of Patent: Apr. 4, 2023

(54) COMMON PDCCH CONFIGURATION

(71) Applicant: Telefonaktiebolaget LM Ericsson (publ), Stockholm (SE)

(72) Inventors: Stefan Parkvall, Bromma (SE); Robert Baldemair, Solna (SE); Jung-Fu Cheng, Fremont, CA (US); Sorour Falahati, Stockholm (SE); Havish Koorapaty, Saratoga, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/477,303

(22) PCT Filed: Jan. 16, 2018

(86) PCT No.: PCT/EP2018/051029
§ 371 (c)(1),
(2) Date: Jul. 11, 2019

(87) PCT Pub. No.: WO2018/130725
PCT Pub. Date: Jul. 19, 2018

(65) Prior Publication Data
US 2020/0037187 A1 Jan. 30, 2020

Related U.S. Application Data

(60) Provisional application No. 62/446,839, filed on Jan. 16, 2017.

(51) Int. Cl.
*H04W 24/10* (2009.01)
*H04W 24/08* (2009.01)
(Continued)

(52) U.S. Cl.
CPC .......... *H04W 24/10* (2013.01); *H04W 24/08* (2013.01); *H04W 36/08* (2013.01); *H04W 72/0446* (2013.01); *H04W 72/0453* (2013.01)

(58) Field of Classification Search
CPC ..... H04W 24/10; H04W 24/08; H04W 36/08; H04W 72/0446; H04W 72/0453; H04L 5/0094; H04L 5/0053; H04L 5/0007
See application file for complete search history.

(56) References Cited

U.S. PATENT DOCUMENTS 9,769,808 B2 9/2017 Liu et al.
9,794,913 B2 10/2017 Lee et al.
(Continued)

FOREIGN PATENT DOCUMENTS

CN 103327521 A 9/2013
CN 104081709 A 10/2014
(Continued)

*Primary Examiner* — Ayanah S George
(74) *Attorney, Agent, or Firm* — Coats & Bennett, PLLC (57) ABSTRACT

The present disclosure describes example techniques for configuring and utilizing common control channels and configuration thereof in wireless communication systems. For instance, in an aspect, the present disclosure describes an example method performed by a network node (106) (also referred to herein as a base station, eNB, next-generation NodeB (gNB), or the like) that includes generating resource location information identifying one or more candidate time-frequency resource locations for a common control channel utilized in the cell. In addition, the example method can include transmitting the resource location information to one or more UEs and/or one or more other network nodes.

21 Claims, 5 Drawing Sheets

(51) Int. Cl.
*H04W 36/08* (2009.01)
*H04W 72/04* (2009.01)
*H04W 72/0446* (2023.01)
*H04W 72/0453* (2023.01)

(56) References Cited

U.S. PATENT DOCUMENTS

| | | | |
|---|---|---|---|
| 9,913,265 B2 | 3/2018 | Guan et al. | |
| 2010/0198953 A1* | 8/2010 | Horn | H04W 72/0406 709/223 |
| 2012/0281567 A1 | 11/2012 | Gao et al. | |
| 2013/0322324 A1* | 12/2013 | Kim | H04W 36/0077 370/315 |
| 2014/0029584 A1* | 1/2014 | Qu | H04L 5/0053 370/336 |
| 2014/0050107 A1 | 2/2014 | Charbit et al. | |
| 2015/0049700 A1* | 2/2015 | Liu | H04L 27/2653 370/328 |
| 2015/0319633 A1* | 11/2015 | Ji | H04W 24/10 370/252 |
| 2015/0327224 A1 | 11/2015 | Guan et al. | |

FOREIGN PATENT DOCUMENTS

| | | | | |
|---|---|---|---|---|
| CN | 104303569 A | 1/2015 | | |
| CN | 104737478 A | 6/2015 | | |
| WO | 2013096555 A1 | 6/2013 | | |
| WO | 2014027768 A1 | 2/2014 | | |
| WO | WO-2014110690 A1 * | 7/2014 | | H04L 1/0055 |
| WO | 2016077701 A1 | 5/2016 | | |

* cited by examiner

COMMON PDCCH CONFIGURATION

TECHNICAL FIELD

The present disclosure generally relates to wireless communication systems, and specifically relates to managing common control channel configuration in wireless communication systems.

BACKGROUND

In current wireless communication systems, user equipment (UE) may be unaware as to the precise time-frequency resources over which control information for a cell will be transmitted by a network node, such as an evolved NodeB (eNB) in Long-Term Evolution (LTE). Instead, the number and location of these time-frequency resources can depend on an aggregation level associated with the communication, among other factors. Because the location of these time-frequency resources could be one of several options, the UE must perform multiple "blind decode" operations to monitor each of these several optional time-resources. Monitoring multiple time-frequency resource locations concurrently, however, leads to increased network latency and decreased system performance.

Thus, improved techniques for control channel selection and discovery are needed to optimize performance and resource utilization relative to those of existing systems.

SUMMARY

The present disclosure describes example techniques for configuring and utilizing common control channels and configuration thereof in wireless communication systems. For instance, in an aspect, the present disclosure describes an example method performed by a network node (also referred to herein as a base station, eNB, next-generation NodeB (gNB), or the like) that includes generating resource location information identifying one or more candidate time-frequency resource locations for a common control channel utilized in the cell. In addition, the example method can include transmitting the resource location information to one or more UEs and/or one or more other network nodes.

In an additional aspect, the present disclosure presents an example method performed by a UE that includes receiving resource location information from a network node, where the resource location information identifies one or more candidate time-frequency resource locations for a common control channel utilized in a cell. In addition, the example method can include monitoring the one or more candidate time-frequency resource locations for signaling communicated over the common control channel.

Embodiments herein also include corresponding apparatus, computer programs, and carriers (e.g., computer program products), as well as network-side aspects performed by a network node.

DETAILED DESCRIPTION

In modern and next-generation (e.g. new radio (NR)) wireless networks, common control channels are utilized to communicate information to one or more UEs in a cell simultaneously. For example, with respect to downlink control signaling, Physical Downlink Control Channels (PDCCHs) are used to communicate downlink control information (DCI) from the network node to the one or more UEs (e.g. downlink scheduling assignments and uplink scheduling grants for these UEs). Generally, the control information transmitted over the PDCCH is transmitted at the beginning of a slot (or any other defined time-frequency unit measure such as a subframe, frame, etc.) and relates to data in the same or a later slot (of course, in the case of mini-slots, PDCCH information can also be transmitted within a regular slot). Different formats defined by different time and frequency ranges of the PDCCHs are possible, which allows the system and the communicating devices to properly handle different DCI payload sizes and different aggregation levels (i.e. different code rate for a given payload size).

In existing systems, a UE may be configured (implicitly and/or explicitly) to blindly monitor (or search) for a number of predefined time-frequency regions that can correspond to different aggregation levels and DCI payload sizes, for instance. Upon detecting a valid DCI message on one or more of these predefined time-frequency locations (i.e. the decoding of a predefined time-frequency region is successful and the DCI contains a particular identifier (ID) the UE is told to monitor) the UE follows the instructions contained within the DCI received over this time-frequency region, include instructions to watch one or more predefined regions to receive the corresponding downlink data and/or to transmit information (e.g., control or user/application data in the uplink). The blind decoding process comes at a cost in complexity in the UE but is required to provide flexible scheduling and handling of different DCI payload sizes.

In $5^{th}$ Generation (5G) New Radio (NR) protocols under development, a "broadcasted control channel" is envisioned, allowing multiple UEs to receive control information somewhat simultaneously. Such a broadcasted control channel can be referred to under a multitude of different names, including, but not limited to, Physical Slot Format Indicator Channel (PSFICH), a "PCFICH-like channel," or "UE-group common control channel." Given that no consensus has been reached regarding the particular nomenclature to be officially attributed to this broadcasted control channel, for purposes of the present disclosure, it can be referred to generally as the "Common PDCCH" or "C-PDCCH." Like its name, the content of such a channel is currently under discussion. One example of information that might be put in such a channel is information about the slot format, i.e. whether a certain slot is uplink or downlink, which portion of a slot is reserved for uplink or downlink transmission, and/or other information that is particularly useful in a dynamic Time Division Duplex (TDD) systems.

In the specific example of LTE systems, a common channel called the Physical Control Format Indicator Channel) is used to indicate the length of the control region, i.e. the number of Orthogonal Frequency-Division Multiplexed (OFDM) symbols used for control signaling in a given time unit or measure, such as a slot. Although this information can be also utilized for example embodiments of the common control channels (e.g., C-PDCCH) presented herein, such embodiments are non-limiting. In other words, unlike the PCFICH in LTE, which uses a rigid structure that is tailor-made for indicating the control region size, the example common control channels introduced by the present disclosure are fully configurable by the system and example devices making up the system (e.g., UEs, network nodes). This allows the system devices to optimize performance of wireless communications between devices, and over the system as a whole, by maximizing time-frequency resource utilization (i.e., through selection of a time-frequency resource location for the common control channel). Ultimately, instead of requiring each UE to perform blind decoding operations on the rigid set of possible time-frequency resource locations, the techniques of the present disclosure present a common control channel paradigm (i.e. C-PDCCH) that renders channel configuration more generic and flexible relative to the case of the PCFICH in LTE. More specific aspects of these techniques will now be described in reference to the accompanying figures.

Figure 1:
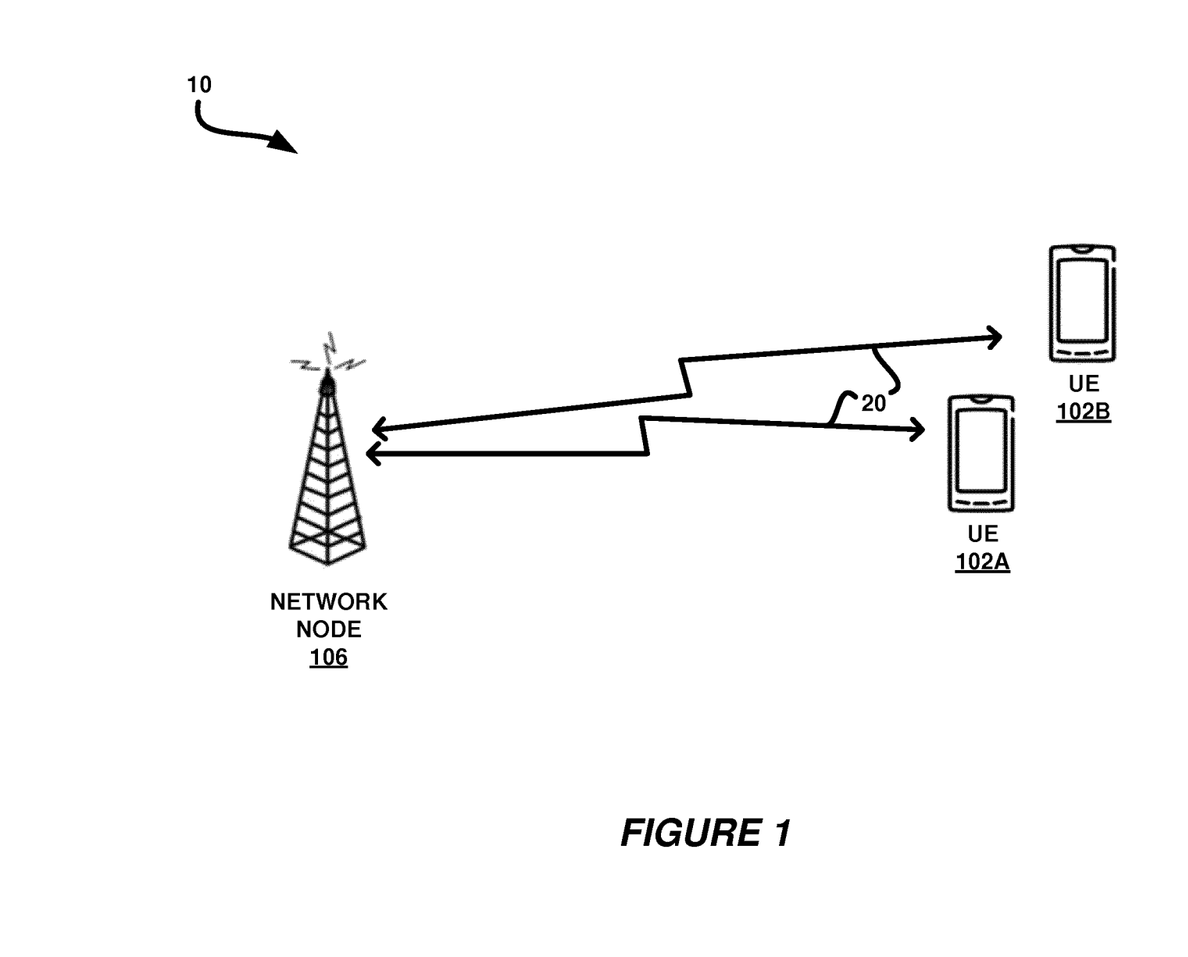
FIG. 1 is a block diagram of a wireless communication system according to one or more embodiments.

FIG. 1 illustrates a wireless communication system 10 according to one or more embodiments. The system 10 includes a network node 106 (such as, but not limited to, a base station, eNB, gNB, etc). The system 10 also includes UEs 102 (also referred to herein as a "terminal, "user terminal," or the like), including UE 102A and 102B, in communication with the network node 106. This communication 20, in addition to uplink and downlink transmission of user/application data, may include uplink control signaling and downlink control signaling (also referred to as control information). In an example of downlink control signaling, each network node 106 can transmit one or more system information blocks (SIBs), which can contain characteristic information associated with each of one or more cells realized through the operation of network node 106.

The communication 20 may occur over one or more communication channels (including a common control channel such as the C-PDCCH) that may each consist of one or more component carriers or subbands. The network node 106 may include circuitry and/or instructions for executions on the circuitry to perform scheduling of communications 20 between the UEs 102 and the network node 106. This scheduling can include selecting, for instance, which time-frequency resource locations (on a grid of possible time-frequency resource locations for a slot, subframe, or the like, for example) are to be utilized for uplink transmission or downlink transmission, and which devices will perform such transmissions over the scheduled time-frequency resources. In other words, in the case of uplink transmission scheduling, the network node 106 can assign (or "grant") certain time-frequency resources to individual UEs 102 over which the uplink communications will occur in the wireless communication system 10. These time-frequency resources may be resource elements, resource blocks, or any other unit of time-frequency resources known in the art. For any given measure of time during the communication 20, an entire channel bandwidth or a portion thereof may be granted to a particular UE 102 or to a plurality of UEs 102. In addition, for purposes of the present disclosure, although each network node 106 may be configured to manage the creation and operation of one or more cells, when a network node is referred to, it can optionally also refer to a particular cell (or in some cases more than one cell) of the network node 106.

As introduced above, the present invention envisions a shared common broadcast or multicast control channel that can be utilized to carry control information from the network node 106 to each UE 102 within its cellular transmission range. Again, the formulations of common control channels (e.g., common PDCCHs) in prior and existing systems (e.g., LAA) consist of a set of wholly predefined channel location possibilities, requiring the UEs 102 to perform a full blind-decoding process to obtain information necessary to identify a common control channel location ultimately selected as such by the network node 106 (i.e. on what resources, in terms of Control Channel Elements (CCEs), OFDM symbols, and OFDM subcarriers, a particular UE is expected to find the common control channel). In fact, in LAA, the pre-defined channel location is directly stated in the specification and therefore mandated. Accordingly, in the existing LAA formulation, the common control channel location cannot be changed or configured for optimized performance.

By utilizing the following techniques, however, a UE 102 of the present disclosure is not required to perform such a rigorous blind-decoding process before finding the common control channel, instead utilizing these processing resources and available time to locate other channels (including UE-specific PDCCH in some examples). Because of this feature of the present disclosure, the common control channel can accommodate high data rates and meet low latency requirements required by next-generation wireless communication specifications such as NR.

Furthermore, unlike existing systems, the location of control channels are configurable by the network node 106 (and/or other network devices), for instance, via system information or other higher-layer signaling (e.g. RRC signaling carried as part of the system information (e.g. SIB/MIB/MSIB), dedicated RRC signaling as part of the general UE configuration when accessing or handing over to a cell, as part of MAC signaling, or through some other means). Accordingly, the UE 102 can be provided with location information indicating a time-frequency resource location (or one or more candidate locations) of the control channel. The configuration may include the time-frequency resources to monitor for the common control channel (e.g. in terms of CCEs, REs, REGs, etc.), the numerology, the possible transmission instants (e.g. every slot, every second slot, every subframe, etc), modulation scheme, payload size, code rate, and/or mutli-antenna scheme.

In a further example aspect, the UE 102 can be configured with a relatively small number of time-frequency resource candidates (i.e., possibilities) to blindly detect in order to identify the bona fide common control channel selected from the candidates and utilized by the network node 106 for transmission. As an example, the UE 102 could foreseeably use two blind decoding attempts in attempting to identify this selected common control channel and any remaining attempts to attempt identification of other channels (e.g., legacy, or "normal" PDCCHs).

In addition, the UE 102 and/or network node 106 can be configured (or can negotiate for) one or more fallback or default values for certain transmission parameters that would have been delivered via the common control channel absent some intervening event blocking such delivery, such as degrading network conditions, connection loss, etc. In other words, this fallback configuration can define default content for values of parameters carried by the common PDCCH. This fallback configuration can be useful in cases where reliable transmission of such values via the common control channel becomes challenging or impossible, or if the network, for various reasons, prevents such parameter value transmission.

In a further aspect, the common control channel configuration can be transferred during a cell handover or reselection process from a handover target cell to the source cell (current serving cell) over the X2 interface or any other communicative connection between network node 106. When received by the source cell, the network node 106 controlling the source cell can proceed to transmit this common control channel configuration information to the UE 102 prior to executing the handover command and/or actual handover is completed. Furthermore, resources for the common control channel may hop across slots and/or control channel occurrences. In instances where channel hopping is implemented, the related hopping information can be included in the overall channel configuration information.

As explained above, to reduce blind decoding as much as possible, in some examples of the present disclosure, a relatively limited number of time-frequency locations and/or corresponding control channel configurations are provided. However, future wireless communication standard releases will likely contain different payload size requirements, different frequency band usage, and the like, thereby likely mandating additional possible configurations. To provide such forward compatibility within a given configuration, the field encoding all the information may have some reserved values that can be used for future releases. As future systems (such as NR additional releases) might support larger system bandwidths that those presently used and/or may support UE-specific bandwidths that are fractions the system bandwidth, this flexibility is key to ensure that the techniques are robust. The same is true of possible numerologies in a common control channel configuration. For instance, NR supports different UE numerologies. To counter these differences, in some examples, the common control channel (C-PDCCH, for instance) can be transmitted by the network node 106 multiple times and at various bandwidth ranges so that its information can be read by UEs monitoring different parts of the system bandwidth. In some examples, the network node 106 can even use different numerologies where necessary.

Furthermore, the network nodes 106 of the present disclosure can indicate to a scheduled UE that data over the common control channel (C-PDCCH) has been sent, e.g. for observability and link adaptation purposes of C-PDCCH. In such cases, a flag is included in a regular DCI indicating that the C-PDCCH data has been transmitted/not transmitted in a slot. This information can then be fed back to the network which can adjust a transmission scheme of the C-PDCCH accordingly.

In further embodiments of the present disclosure, certain additional information may be included in configurable broadcast or multicast control. In fact, the content of the common control channel described herein can include many different pieces of information. One example is related to Channel State Information (CSI) reporting or Sounding Reference Signal (SRS or SR) opportunities. Accordingly, a UE 102 can be configured with periodic CSI reporting or SR opportunities under the condition that the common control channel indicates an uplink slot. In such cases where the uplink slot is indicated, the UE 102 can report CSI (or, if needed, transmit an SR). When the periodic instant happens, the UE will transmit the CSI report (or SR) only if the common control channel indicates an uplink. Thus, two example types of periodic configuration for CSI (and SR, etc) and information in the common broadcast control channel can exist in such instances: (a) one 'conditional periodic' where a CSI report (or SRS) is transmitted only if the common control channel is reliable received and allows for transmission and (b) one 'absolute conditional' where the report is transmitted irrespective of the common control channel.

What is more, a similar principle can be applied to uplink transmissions, in general, instead of being limited to CSI or SRS transmissions. Other information that can be included in the configurable common control channel could include, for instance, an indication of measurement opportunities (slots or other periods in time) where measurements can be made by the UE at certain frequencies. Additionally or alternatively, radio resource management (e.g., reference signal received power (RSRP) measurement) information, information related to interference suppression and cancellation including cross-link interference mitigation information (uplink from another cell interfering with downlink transmissions from a serving cell or vice-versa), and/or information relevant to beam management and/or phase tracking.

For the case of RSRP measurements, the network node 106 may indicate particular subframes when measurements should be made for the own cell or for other cells. This could help the network node 106 to ensure that RSRP measurements are made when the network node 106 is transmitting signals at a certain power or with a certain beamforming configuration to ensure that coverage is maintained. Similarly, neighbor cell measurements can be made at appropriate instances when other cells in the network may be transmitting signals at the desired powers or in beam directions where the neighbor cell's power reaches this cell.

For interference cancellation and cross-link mitigation, the network node 106 may indicate particular subframes where a specific SRS on which measurements need to be made to enable interference suppression or cancellation will be transmitted by the serving or neighboring cells. For cross-link interference cancellation it could also be useful for a UE 102 to obtain cross-link related parameters even for neighboring cells. A UE 102 could be configured to search for multiple C-PDCCH which are associated with different cells. Alternatively, one C-PDCCH could contain essential cross-link parameters even from neighboring cells. For instance, a C-PDCCH could contain slot information even from neighboring cells or as a minimum indicated if neighboring cells have the same slot configuration. The control channel may be configured to deliver unicast as well as broadcast/multicast information (e.g. a common control channel) or be specifically designed only as a light weight separate channel for broadcast/multicast transmissions.

Figure 2:
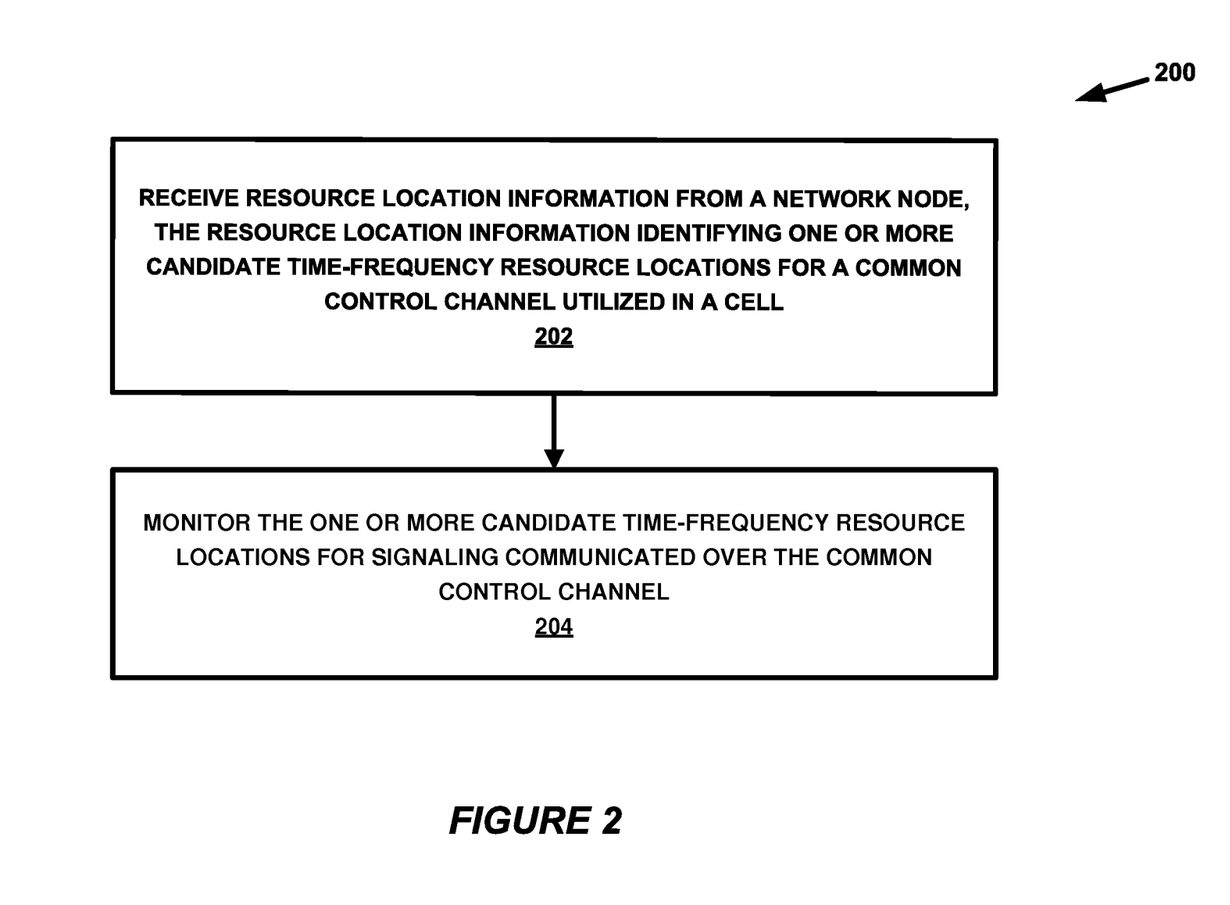
FIG. 2 is a logical flow diagram illustrating a method performed by a network node according to one or more embodiments.

FIG. 2 presents an example method 200 performed by a network node 102 associated with a cell in a wireless communication system. In an aspect, the method 200 can, at block 202, generate resource location information identifying one or more candidate time-frequency resource locations for a common control channel (e.g., C-PDCCH) utilized in the cell. The method 200 also can include, at block 204, transmitting the resource location information to one or more user equipment and/or one or more other network nodes.

Furthermore, although not included explicitly in FIG. 2, method 200 can optionally include one or more of the following aspects. For instance, the method can include the network node 106 selecting a time-frequency resource location of the one or more candidate time-frequency resource locations for the common control channel and transmitting control signaling to the one or more UEs over the selected time-frequency resource.

In some example embodiments, the control signaling includes an uplink opportunity indicator, the uplink opportunity indicator identifying a time period during which an uplink transmission opportunity exists for the one or more UEs. In addition, in some examples, the method 200 can include receiving a channel state indicator (CSI) report and/or scheduling request (SR) transmitted during the identified time period by at least one of the one or more UEs responsive to transmitting the control signaling comprising the uplink opportunity indicator.

In addition, the control signaling can include a measurement opportunity indicator, the measurement opportunity indicator identifying a time period during which a UE measurement opportunity exists for the one or more UEs. The measurement opportunity indicator can identify the time period as one or more slots, one or more subframes, and/or one or more symbols, and/or identifies one or more reference signals to be measured by a UE during the time period.

In some examples, the control signaling comprises time-frequency resource location information, configuration information, and/or timing information corresponding to respective common control channels of one or more neighbor cells.

In some examples, the method can include the network node 106 receiving one or more measurement reports from the one or more UEs responsive to transmitting the measurement opportunity indicator and/or the time-frequency resource location information, configuration information, and/or timing information corresponding to the respective common control channels of the one or more neighbor cells. Also, the control signaling can include unicast signals transmitted to a single UE or multicast or broadcast signals.

In addition, the method can include receiving a handover request message from a source network node requesting handover of a UE from the source network node to the network node, where transmitting the resource location information to one or more network nodes includes transmitting the resource location information to the source network node responsive to receiving the handover request message.

The method can include generating configuration information for the common control channel, the configuration information including values for one or more of a numerology, a periodicity, a modulation scheme, a payload size, a code rate, a multi-antenna scheme, and/or fallback values to be used as configuration information values where current configuration information is unavailable. It can also include receiving a handover request message from a source network node requesting handover of a UE from the source network node to the network node and transmitting the configuration information and the resource location information to the source network node responsive to receiving the handover request message.

The resource location information can be transmitted to the one or more UEs via one or more system information blocks (SIB), one or more master information blocks (MIBs), one or more master system information blocks (MSIBs), dedicated radio resource control (RRC) signaling, and/or media access control (MAC) signaling. The method can also include adding a flag to downlink control information (DCI) message, the flag indicating whether control information has been transmitted by the network node in a slot and transmitting the DCI message to the one or more UEs. The resource location information identifies one or more control channel elements (CCEs), one or more resource element groups (REGs), and/or one or more resource elements (REs). In addition, the one or more candidate time-frequency resource locations can span a plurality of slots and/or a plurality of transmission occurrences over the common control channel.

Figure 3:
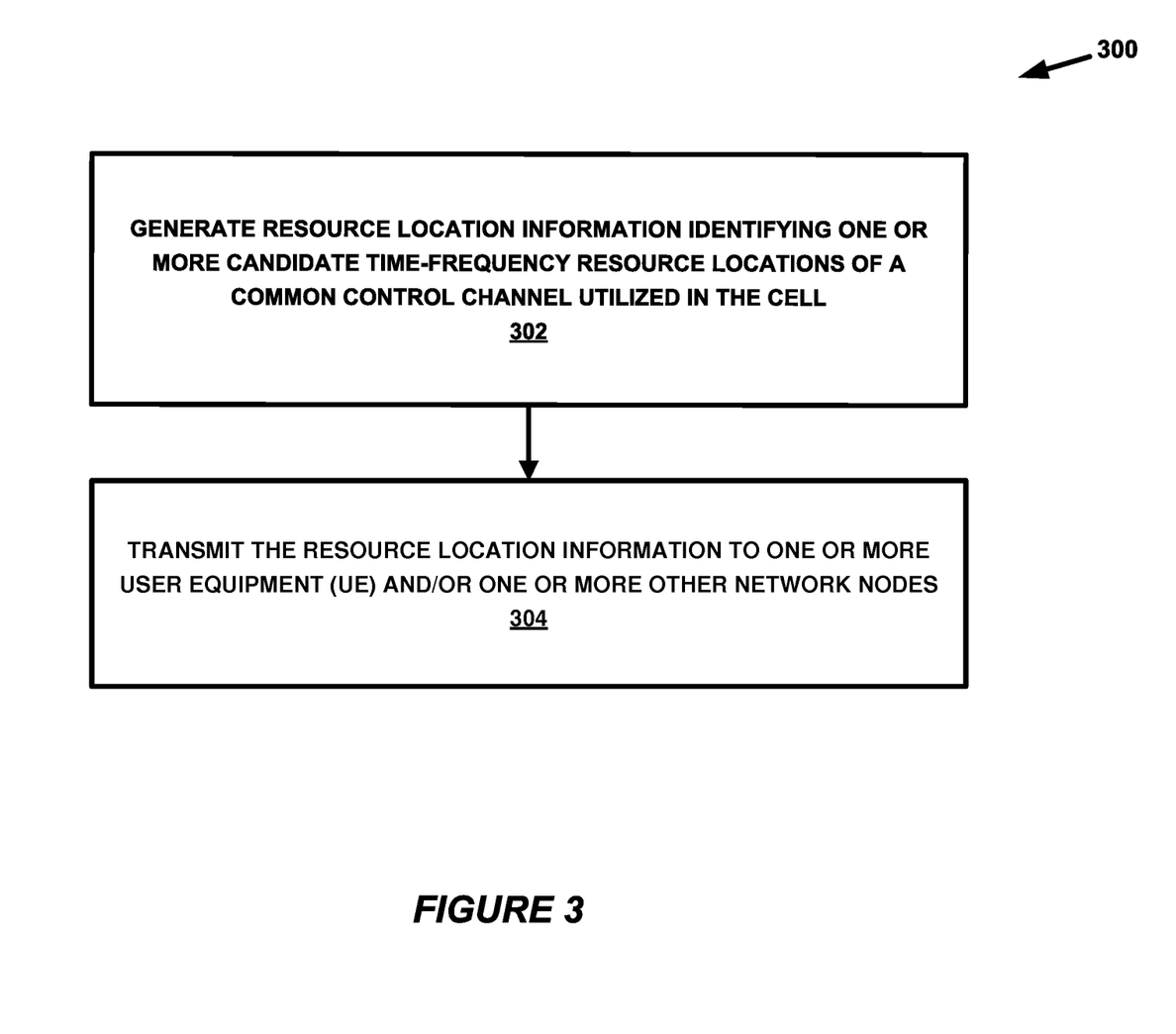
FIG. 3 is a logical flow diagram illustrating a method performed by a UE according to one or more embodiments.

FIG. 3 presents an example method 300 performed by a UE in a wireless communication system, the method including, at block 302, receiving resource location information from a network node, the resource location information identifying one or more candidate time-frequency resource locations for a common control channel utilized in a cell. In addition, at block 304, the method can include monitoring the one or more candidate time-frequency resource locations for signaling communicated over the common control channel.

Furthermore, although not explicitly shown in FIG. 3, the method can optionally include any of the aspects that follow. For instance, method 300 can include receiving control signaling from the network node on the common control channel over the identified time-frequency resource, and the control signaling can include an uplink opportunity indicator, the uplink opportunity indicator identifying a time period during which an uplink transmission opportunity exists for the UE to transmit uplink signaling.

The method can further include transmitting a channel state indicator (CSI) report and/or scheduling request (SR) during the identified time period responsive to the receiving the uplink opportunity indicator in the control signaling. In addition, the control signaling can include a measurement opportunity indicator, the measurement opportunity indicator identifying a time period during which a UE measurement opportunity exists for the UE. The measurement opportunity indicator can identify the time period as one or more slots, one or more subframes, and/or one or more symbols and/or one or more reference signals to be measured by the UE during the time period. In some examples, the control signaling comprises time-frequency resource location information, configuration information, and/or timing information corresponding to respective common control channels of one or more neighbor cells.

Some examples of the method can include performing measurements on the indicated reference signals and/or the common control channels of one or more neighbor cells based on the received time-frequency resource location information, configuration information, and/or timing information. Some instances can include generating one or more measurement reports based on the measurements, and some may include transmitting the measurement reports to the network node. The control signaling can include unicast signals, or multicast or broadcast signals.

The method 300 can optionally include receiving configuration information for the common control channel from the network node, the configuration information including values for one or more of a numerology, a periodicity, a modulation scheme, a payload size, a code rate, a multi-antenna scheme, and/or prioritized information values to be used where current configuration information is unavailable. In an aspect, the resource location information is received via one or more system information blocks (SIB), one or more master information blocks (MIBs), one or more master system information blocks (MSIBs), dedicated radio resource control (RRC) signaling, and/or media access control (MAC) signaling.

The method 300 can also include receiving downlink control information (DCI) message comprising a flag indicating whether control information has been transmitted by the network node in a slot. The resource location information identifies one or more control channel elements (CCEs), one or more resource element groups (REGs), and/or one or more resource elements (REs) in some examples. In certain embodiments, the one or more candidate time-frequency resource locations spans a plurality of slots and/or a plurality of transmission occurrences over the common control channel. And furthermore, as stated above, the common control channel can be a common physical downlink control channel (C-PDCCH).

Figure 4A:
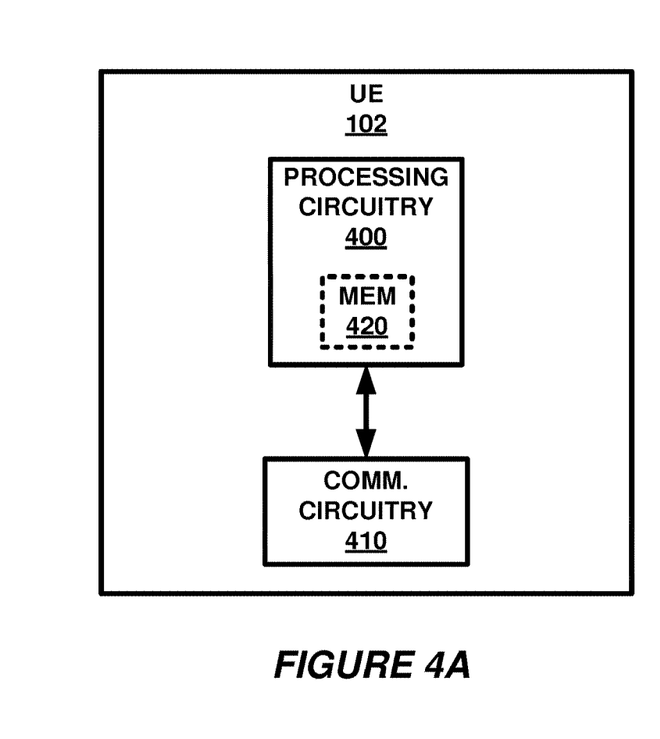
FIG. 4A is a block diagram of a UE according to one or more embodiments.

FIG. 4A illustrates a UE 102 implemented in accordance with one or more embodiments. As shown, the UE 102 includes processing circuitry 400 and communication circuitry 410. The communication circuitry 410 is configured to transmit and/or receive information to and/or from one or more network nodes 106 via any communication technology. Such communication may occur via one or more antennas that are either internal or external to the UE 102. The processing circuitry 400 is configured to perform processing described above, such as by executing instructions stored in memory 420. The processing circuitry 400 in this regard may implement certain functional means, units, or modules.

Figure 4B:
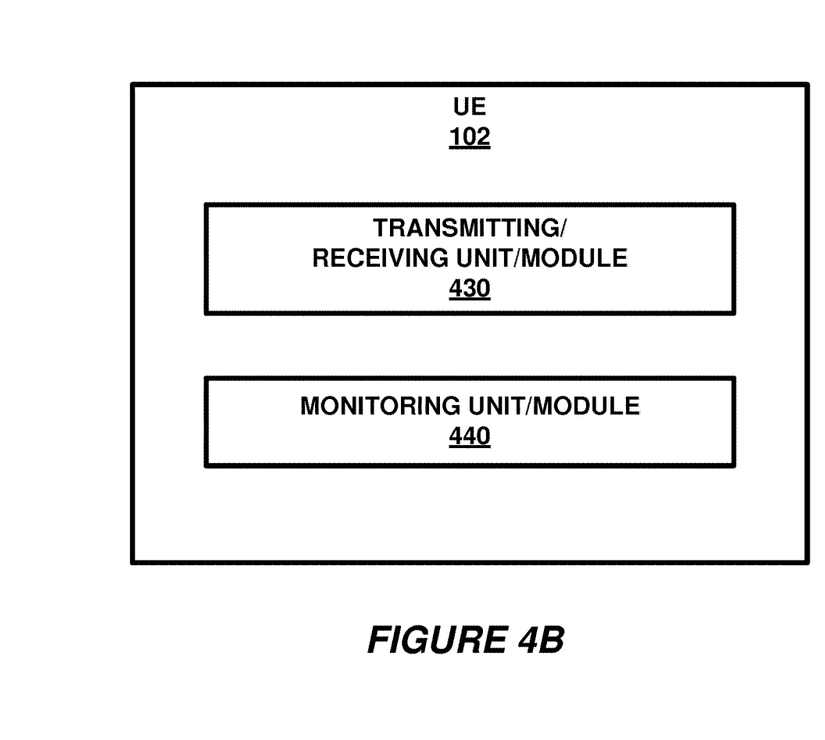
FIG. 4B is a block diagram of a UE according to one or more other embodiments.

FIG. 4B illustrates a UE 102 implemented in accordance with one or more other embodiments. As shown, the UE 102 implements various functional means, units, or modules, e.g., via the processing circuitry 400 in FIG. 4A and/or via software code. These functional means, units, or modules, e.g., for implementing the method 300 in FIG. 3 and the frame structures of at least FIGS. 1 and/or 5-8, include for instance a receiving unit or module 430 for receiving resource location information from a network node, the resource location information identifying one or more candidate time-frequency resource locations for a common control channel utilized in a cell; and a monitoring unit or module 440 for monitoring the one or more candidate time-frequency resource locations for signaling communicated over the common control channel.

Figure 5A:
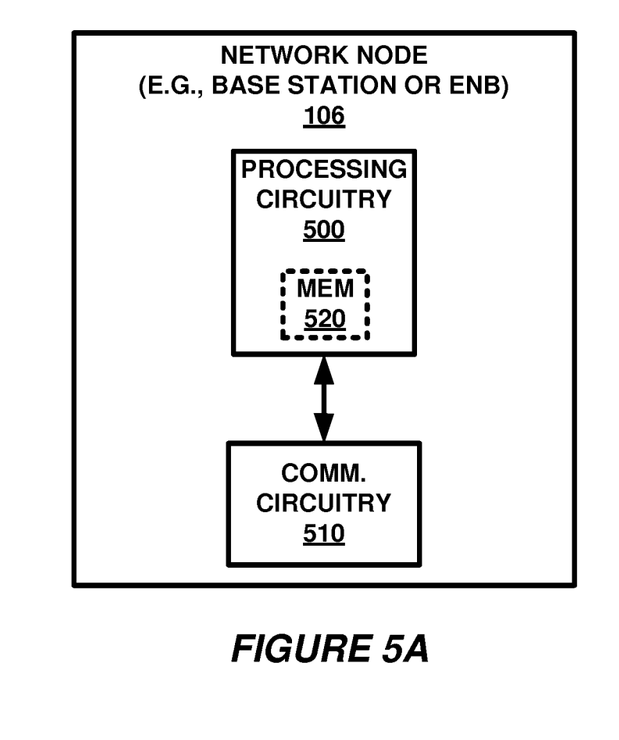
FIG. 5A is a block diagram of a network node according to one or more embodiments.

FIG. 5A illustrates a network node 56, such as a base station, eNB, gNB, or other network-side devices, implemented in accordance with one or more embodiments. As shown, the network node 56 includes processing circuitry 500 and communication circuitry 510. The communication circuitry 510 is configured to transmit and/or receive information to and/or from one or more UEs 52 and/or one or more other nodes, e.g., via any communication technology. Such communication may occur via one or more antennas that are either internal or external to the network node 56. The processing circuitry 500 is configured to perform processing described above, e.g., in FIG. 3, such as by executing instructions stored in memory 520. The processing circuitry 500 in this regard may implement certain functional means, units, or modules.

Figure 5B:
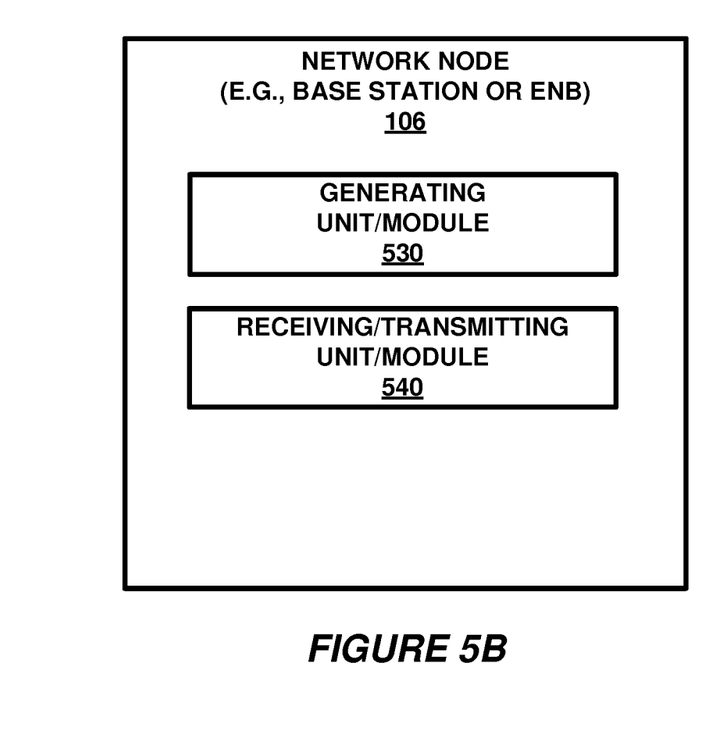
FIG. 5B is a block diagram of a network node according to one or more other embodiments.

FIG. 5B illustrates a network node 56 implemented in accordance with one or more other embodiments. As shown, the network node 56 implements various functional means, units, or modules, e.g., via the processing circuitry 500 in FIG. 5A and/or via software code. These functional means, units, or modules, e.g., include for instance a generating unit or module 530 for generating resource location information identifying one or more candidate time-frequency resource locations for a common control channel utilized in the cell; and will also include a transmitting unit or module 540 for transmitting the common control signal to one or more UEs.

Those skilled in the art will also appreciate that embodiments herein further include corresponding computer programs. A computer program comprises instructions which, when executed on at least one processor of a node, cause the node to carry out any of the respective processing described above. A computer program in this regard may comprise one or more code modules corresponding to the means or units described above. Embodiments further include a carrier containing such a computer program. This carrier may comprise one of an electronic signal, optical signal, radio signal, or computer readable storage medium. In this regard, embodiments herein also include a computer program product stored on a non-transitory computer readable (storage or recording) medium and comprising instructions that, when executed by a processor of a network node or UE, cause the node or UE to perform as described above. Embodiments further include a computer program product comprising program code portions for performing the steps of any of the embodiments herein when the computer program product is executed by a computing device. This computer program product may be stored on a computer readable recording medium.

Furthermore, the processing or functionality of network node 106 may be considered as being performed by a single instance or device or may be divided across a plurality of instances of network node 106 that may be present in a given network/environment such that together the device instances perform all disclosed functionality. In addition, network node 106 may be any known type of device associated with a wireless communication network, radio communication network, or content delivery network, generally, that is known to perform a given disclosed processes or functions thereof. Examples of such network nodes include eNBs (or other types of base stations or access points), Mobility Management Entities (MMEs), gateways, servers, and the like.

In any scenario discussed above, the UE 102 herein may be, or may be comprised of any wireless communication device that is able to communicate wirelessly with a wireless communication network, and may include, in some examples, mobile devices such as mobile phones, PDAs, tablets, computers (mobile or otherwise) laptops, or the like. In addition the UE 102 may comprise an Internet-of-Things device, e.g. a device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method performed by a network node associated with a cell in a wireless communication system, the method comprising:
  selecting one or more candidate time-frequency resource locations for a common control channel utilized in the cell;

generating resource location information identifying the one or more candidate time-frequency resource locations selected for the common control channel utilized in the cell;

transmitting the resource location information to one or more user equipment (UE) and/or one or more other network nodes; and dynamically reconfigure a time slot configuration in use by one or more UEs by transmitting control signaling to the one or more UEs over the selected time-frequency resource, wherein the control signaling comprises information about a slot format that is indicative of whether a certain slot is uplink or downlink, and which portion of a slot is reserved for uplink or downlink transmission.

2. The method of claim 1, wherein the control signaling comprises an uplink opportunity indicator, the uplink opportunity indicator identifying a time period during which an uplink transmission opportunity exists for the one or more UEs.

3. The method of claim 2, further comprising receiving a channel state indicator (CSI) report and/or scheduling request (SR) transmitted during the identified time period by at least one of the one or more UEs responsive to transmitting the control signaling comprising the uplink opportunity indicator.

4. The method of claim 1, wherein the control signaling comprises a measurement opportunity indicator, the measurement opportunity indicator identifying a time period during which a UE measurement opportunity exists for the one or more UEs.

5. The method of claim 4, wherein the measurement opportunity indicator identifies the time period as one or more slots, one or more subframes, and/or one or more symbols.

6. The method of claim 4, wherein the measurement opportunity indicator identifies one or more reference signals to be measured by a UE during the time period.

7. The method of claim 1, wherein the control signaling comprises time-frequency resource location information, configuration information, and/or timing information corresponding to respective common control channels of one or more neighbor cells.

8. The method of claim 4, further comprising receiving one or more measurement reports from the one or more UEs responsive to transmitting the measurement opportunity indicator.

9. The method of claim 1, wherein the control signaling comprises unicast signals transmitted to a single UE.

10. The method of claim 1, wherein the control signaling comprises multicast or broadcast signals.

11. The method of claim 1:
further comprising receiving a handover request message from a source network node requesting handover of a UE from the source network node to the network node;
wherein transmitting the resource location information to one or more network nodes comprises transmitting the resource location information to the source network node responsive to receiving the handover request message.

12. The method of claim 1, further comprising generating configuration information for the common control channel, the configuration information including values for a numerology, a periodicity, a modulation scheme, a payload size, a code rate, a multi-antenna scheme, and/or fallback values to be used as configuration information values where current configuration information is unavailable.

13. The method of claim 7, further comprising:
receiving a handover request message from a source network node requesting handover of a UE from the source network node to the network node; and
transmitting the configuration information and the resource location information to the source network node responsive to receiving the handover request message.

14. The method of claim 1, wherein the resource location information is transmitted to the one or more UEs via one or more system information blocks (SIBs), one or more master information blocks (MIBs), one or more master system information blocks (MSIBs), dedicated radio resource control (RRC) signaling, and/or media access control (MAC) signaling.

15. The method of claim 1, further comprising:
adding a flag to downlink control information (DCI) message, the flag indicating whether control information has been transmitted by the network node in a slot; and
transmitting the DCI message to the one or more UEs.

16. The method of claim 1, wherein the resource location information identifies one or more control channel elements (CCEs), one or more resource element groups (REGs), and/or one or more resource elements (REs).

17. The method of claim 1, wherein the one or more candidate time-frequency resource locations spans a plurality of slots and/or a plurality of transmission occurrences over the common control channel.

18. A method performed by a user equipment (UE) in a wireless communication system, the method comprising:
receiving resource location information from a network node, the resource location information identifying one or more candidate time-frequency resource locations selected by the base station for a common control channel utilized in a cell;
monitoring the one or more of the candidate time-frequency resource locations for signaling communicated over the common control channel; and
receiving control signaling from the network node in one of the selected candidate time frequency resource locations; and
dynamically reconfigure a time slot configuration responsive to control signaling received from the network node on the common control channel over the identified time-frequency resource, wherein the control signaling comprises information about a slot format that is indicative of whether a certain slot is uplink or downlink, and which portion of a slot is reserved for uplink or downlink transmission.

19. A network node associated with a cell in a wireless communication system, the network node comprising:
processing circuitry;
memory containing instructions executable by the processing circuitry whereby the network node is operative to:
selecting one or more candidate time-frequency resource locations for a common control channel;
generate resource location information identifying the one or more candidate time-frequency resource locations selected for the common control channel utilized in the cell;
transmit the resource location information to one or more user equipment, UE, and/or one or more other network nodes; and
dynamically reconfigure a time slot configuration in use by one or more UEs by transmitting control signaling to the one or more UEs over the selected time-frequency resource, wherein the control signaling comprises information about a slot format that is indicative of whether a certain slot is uplink or downlink, and which portion of a slot is reserved for uplink or downlink transmission.

20. The network node of claim 19, wherein the instructions are such that the network node is further operative to:
transmit control signaling to the one or more UEs over the selected time-frequency resource.

21. A user equipment (UE) in a wireless communication system, the UE comprising:
processing circuitry;
memory containing instructions executable by the processing circuitry whereby the UE is operative to:
receive resource location information from a network node, the resource location information identifying one or more candidate time-frequency resource locations selected by the base station for a common control channel utilized in a cell;
monitor the one or more candidate time-frequency resource locations for signaling communicated over the common control channel; and
dynamically reconfigure a time slot configuration in use by the UE responsive to control signaling control signaling received from the network node in one of the selected candidate time frequency resource locations, wherein the control signaling comprises information about a slot format that is indicative of whether a certain slot is uplink or downlink, and which portion of a slot is reserved for uplink or downlink transmission.

* * * * *